(No Model.)

C. C. WALWORTH.
PIPE CUTTER.

No. 262,264. Patented Aug. 8, 1882.

Witnesses
John F. C. Preinkert
Fred A. Powell

Inventor:
Caleb C. Walworth
by Crosby & Gregory
attys.

UNITED STATES PATENT OFFICE.

CALEB C. WALWORTH, OF BOSTON, MASSACHUSETTS.

PIPE-CUTTER.

SPECIFICATION forming part of Letters Patent No. 262,264, dated August 8, 1882.

Application filed June 10, 1882. (No model.)

*To all whom it may concern:*

Be it known that I, CALEB C. WALWORTH, of Boston, county of Suffolk, State of Massachusetts, have invented an Improvement in Pipe-Cutters, of which the following description, in connection with the accompanying drawings, is a specification.

My invention relates to pipe-cutters, and is embodied in a pipe-cutting device substantially such as shown in Letters Patent No. 23,792, dated April 26, 1859, to which reference may be had. In the said patent a rotating cutter is employed, it being revolved about the pipe and pressed toward it with great force, so that it gradually cuts through the said pipe, it being rotated as it revolves by its engagement with the surface being cut. In order to give the said rotating cutter a sufficiently large bearing-surface on its pivot or arbor to prevent it from wearing the said arbor too rapidly, it has to have a large hub, and the said hub has heretofore been made integral with the cutting portion. This construction renders it very difficult to properly temper the said cutters, as the large mass of metal at the hub is very apt to cause the thin cutting-periphery to fracture when suddenly cooled in the process of tempering. I have discovered that this difficulty can be wholly overcome, and a more perfect and durable cutter can be produced by my invention, which consists in making the hub and cutting portion independently and subsequently fastening them together, preferably by screw-threads. The cutting portion of a cutter made in this way may be made from sheet-steel, thus producing a cutter of better quality than those heretofore in use, and the hub portion may be made of material especially adapted for a bearing-surface. The hub is provided with a shoulder, against which the cutting portion may be tightly screwed, so that the two portions will rotate together as one piece without wear between their surfaces that are in contact with one another.

Figure 1:
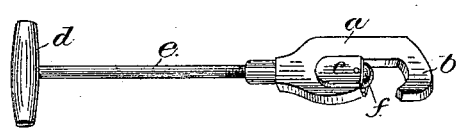
Figure 4:
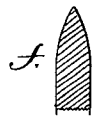
Figure 2:
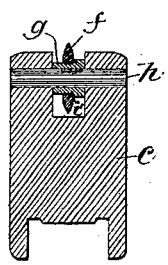
Figure 5:
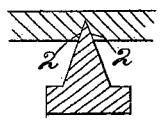
Figure 3:

Figure 1 is a perspective view of a pipe-cutting device provided with this invention; Fig. 2, a longitudinal section of the cutter-carrying block; Fig. 3, a side elevation of the cutter detached; Fig. 4, an enlarged section of one of my improved cutters, and Fig. 5 a section of a cutter as heretofore used.

The stock $a$, with its pipe-receiving claw $b$, the cutter-carrying block $c$, mounted to move in the stock $a$ toward the claw $b$, and the handle $d$, with its threaded shank $e$, bearing against block $c$ and serving to swing the entire apparatus around the pipe being cut, and at the same time, by turning the said shank $e$ on its axis, to force the block $c$ with its cutter toward and into the side of the pipe held between it and the claw $b$, are all shown as substantially the same as in the patent referred to.

The cutter consists of a disk, $f$, preferably of sheet-steel, and provided with a threaded central opening, it having a cutting-edge and curved sides, as shown in Fig. 4. The said disk $f$ is mounted on a hub, $g$, having a central opening, which affords a long bearing on a pin or arbor, $h$, in the block $c$, the said hub having external threads and a shoulder, $i$, to receive the disk $f$, which is screwed very tightly thereon, so that the said disk and hub operate as a single piece rotating on the pin $h$. By this construction the disk $f$ can be easily tempered and the hub $g$ can be made of suitable hardness to co-operate with the surface of the pin $h$ as a bearing. The disk $f$ can be made of just sufficient thickness to give it proper strength, so that when it has entered deeply into the metal being cut its sides will bear on the metal much less than is the case with cutters, such as formerly used, constructed of a single piece in which the beveled sides extend as far as the hub, and consequently after the cutters have entered the metal to some depth their beveled sides bear heavily on the metal, as shown at 2, Fig. 5, thus requiring enormous pressure to cause the edge of the cutter to act. If the disk $f$ were mounted directly on the pin $h$, it would wear the said pin very rapidly, owing to the intensity of the pressure between the bearing-surfaces.

I claim—

1. In a pipe-cutter, the combination, with the stock and its claw, of the cutter-carrying block provided with a pin or arbor, and the cutter consisting of a hub portion and a cutting disk, made independently and rigidly connected together to operate as a single piece, the said hub portion having a central opening to rotate upon the said arbor, substantially as described.

2. As an improved article of manufacture, the cutter, consisting of the cutting-disk having a threaded central opening, combined with the hub portion, threaded and shouldered to receive the said disk and having a central opening to receive the arbor, substantially as and for the purpose described.

In testimony whereof I have signed my name to this specification in the presence of two subscribing witnesses.

CALEB C. WALWORTH.

Witnesses:
G. W. GREGORY,
JOS. P. LIVERMORE.